United States Patent [19]

Krinski et al.

[11] Patent Number: 4,689,381

[45] Date of Patent: Aug. 25, 1987

[54] MODIFIED PROTEIN ADHESIVE BINDER AND PROCESS FOR PRODUCING USING CATIONIC MONOMERS

[75] Inventors: Thomas L. Krinski, Granite City, Ill.; Charles E. Coco, St. Louis, Mo.; Alan L. Steinmetz, West Bloomfield, Mich.

[73] Assignee: Ralston Purina Company, St. Louis, Mo.

[21] Appl. No.: 846,402

[22] Filed: Mar. 31, 1986

Related U.S. Application Data

[63] Continuation-in-part of Ser. No. 696,941, Jan. 31, 1985, abandoned.

[51] Int. Cl.$^4$ .................... C08J 7/16; C08L 89/00; C09J 3/18
[52] U.S. Cl. .................... 527/201; 106/124; 106/154.1; 527/202; 527/203; 530/370; 530/377; 530/378
[58] Field of Search .................... 106/154.1, 124; 530/377, 378, 370; 527/201, 202, 203

[56] References Cited

U.S. PATENT DOCUMENTS

| | | | |
|---|---|---|---|
| 1,955,375 | 4/1934 | Cone et al. | 106/154.1 X |
| 2,394,043 | 2/1946 | Davidson | 106/154.1 |
| 2,398,317 | 4/1946 | Mackenzie et al. | 530/354 |
| 2,409,475 | 10/1946 | Cline | 530/378 X |
| 2,484,878 | 10/1949 | Eberl | 106/154.1 |
| 2,516,531 | 7/1950 | Shibe | 530/377 X |
| 2,862,918 | 12/1958 | Meyer et al. | 530/378 |
| 2,932,589 | 4/1960 | Meyer et al. | 106/154.1 X |
| 3,239,549 | 3/1966 | Weldes | 106/154.1 X |
| 3,313,749 | 4/1967 | Ready | 527/203 |
| 3,316,112 | 4/1967 | Langner | 106/154.1 X |
| 3,891,580 | 6/1975 | Morris et al. | 527/201 |
| 4,474,694 | 10/1984 | Coco et al. | 530/378 X |
| 4,554,337 | 11/1985 | Krinski et al. | 530/378 X |

OTHER PUBLICATIONS

Encyclopedia of Chemical Technology, 16, 2nd Ed. (1969), Kirk et al., pp. 859–864.
Encyclopedia of Polymer Science & Technology, I, (1964), pp. 489–490.

Primary Examiner—Howard E. Schain
Attorney, Agent, or Firm—Virgil B. Hill

[57] ABSTRACT

A modified vegetable protein adhesive binder and a process for producing the same is disclosed wherein an alkaline protein dispersion is formed of a vegetable protein material and said dispersion is treated with a cationic monomer, preferably a cationic monomer selected from the group consisting of cationic epoxide monomers and cationic acrylate monomers, in an amount sufficient to modify the protein material. The modified vegetable protein adhesive binder has a greater affinity for pigments in a paper coating composition. This greater pigment affinity results in an improvement in the porosity of the final coating, thereby improving ink receptivity and printability on the coating surface.

17 Claims, No Drawings

MODIFIED PROTEIN ADHESIVE BINDER AND PROCESS FOR PRODUCING USING CATIONIC MONOMERS

BACKGROUND OF THE INVENTION

The present application is a continuation in part of pending U.S. application Ser. No. 696,941 filed Jan. 31, 1985, now abandoned.

This invention relates to a modified vegetable protein adhesive binder and a process for producing the same.

Vegetable protein materials are well known as adhesive binders for pigment containing coatings which are used for the coating of paper. Pigment containing coatings provide the paper with a desirable finish, gloss, and smoothness. The functions of the pigment in the coating are to fill in the irregularities of the paper surface and to produce an even and uniformly absorbent surface for printing. The adhesive binder functions to bind the pigment particles to each other as well as to the surface of the coating. The selection of a suitable adhesive is therefore an important factor in the quality of a coating applied to paper.

Vegetable protein materials have been extensively used as adhesive binders for paper coatings, and among those materials have been the vegetable protein isolates, typically soy isolate. Isolated soy protein is produced by the treatment of oil free soy bean flakes with an alkaline solution to dissolve the protein which is removed from the non soluble materials by filtration or centrifugation. The protein is then recovered from the solution by the addition of acid in order to precipitate the protein at its isoelectric point. The precipitated protein is then in an unhydrolyzed or generally unmodified state and can be dried and subsequently dispersed in an alkaline medium to form an adhesive binder for use in the preparation of pigment containing paper coating compositions. The unhydrolyzed or unmodified soy protein isolates are generally less desirable as adhesive binders for paper coatings because of relatively low solubility in weak alkaline solutions, high solution viscosity and sensitivity to heat, besides a tendency to form gels at temperatures of about 160° F. Because of these disadvantages, unmodified or non-hydrolyzed soy protein is usually modified in some way to lower the viscosity of coating compositions containing these materials as binders and furthermore to increase the adhesive strength of the protein when it is dispersed in weak alkaline solutions. Modification or hydrolysis of the protein also reduces the sensitivity of the protein to heat. Modification of the protein usually consists of hydrolysis or treatment of the extracted protein in an aqueous dispersion with various alkaline reagents under controlled conditions of pH, temperature and time. These conditions dissociate the native or unmodified protein structure into smaller subunits thereby improving the solubility of this material as a binder in paper coatings.

Another means of modifying the protein is to treat the unmodified protein with various chemical reagents in order to alter the rheological properties of coatings containing the modified protein material as a binder. Generally, the purpose of modifying the protein is to provide for increased fluidity of the protein material in alkaline dispersions and also much lower viscosity of coating compositions prepared with the modified protein material as a binder.

U.S. Pat. No. 2,862,918 describes such a modified protein wherein an isolated soy protein which has been hydrolyzed beyond the gel stage is acylated by treatment of the hydrolyzed soy protein material with a carboxylic acid anhydride, such as acetic anhydride. U.S. Pat. No. 2,932,589 describes a paper coating composition and process in which a modified soy protein material is produced by reaction of an isolate with a dicarboxylic acid anhydride, such as phthalic anhydride.

U.S. Pat. No. 4,474,694 also describes a modified vegetable protein adhesive binder and a process for producing the same in which an alkaline dispersion of a vegetable protein material is reacted initially with a reducing agent, followed by reaction with a carboxylic acid anhydride to modify the protein material and provide a coating with improved strength and ink receptivity.

In spite of the various improvements that have been obtained by chemical modification of vegetable protein material and the use of these materials in the preparation of paper coating compositions, it would still be desirable to obtain a modified protein material having improved rheological properties. This objective has been generally achieved in the present invention by the production of a modified vegetable protein material which is suitable as an adhesive binder in paper coating compositions containing pigments.

It is therefore an object of the present invention to provide a modified proteinaceous adhesive binder of good rheological properties.

It is a further object to provide a modified vegetable protein adhesive binder having good pigment binding and paper coating characteristics.

SUMMARY OF THE INVENTION

These and other objects are achieved in the present invention by the production of a modified vegetable protein adhesive binder having good rheological and paper coating characteristics. The present invention provides a process for the production of a modified vegetable protein adhesive binder which is suitable for use in pigment coating compositions wherein the process of producing the modified binder comprises forming an alkaline dispersion of a vegetable protein material followed by reaction of the dispersion with a cationic monomer in an amount sufficient to modify the protein material. The cationic monomer provides a means for reacting with the vegetable protein material thereby providing a protein material with enhanced cationic properties. This accordingly increases the affinity of the binder for pigments in a paper coating composition, thereby improving the quality of the coating insofar as printability and ink receptivity. Preferred cationic monomers are selected from the group consisting of cationic epoxide monomers and cationic acrylate monomers. The use of the cationic monomer for modification of the vegetable protein material pursuant to the present invention provides a unique cationically charged vegetable protein material having improved characteristics in pigment containing paper coating compositions prepared therewith.

DESCRIPTION OF THE PREFERRED EMBODIMENTS

The present invention applies to a modified protein material suitable as an adhesive binder in paper coating compositions. More specifically the present invention pertains to a vegetable protein material, such as a vegetable protein isolate and most preferably to a soy isolate. A soy isolate is the most commonly produced protein isolate derived from vegetable plant sources. The present invention is therefore described with respect to a soy isolate since this is the primary area of concern for which the present invention was developed, although it is apparent that other vegetable protein materials can be employed and modified in a similar manner if desired. For purposes of explanation in the context of the present invention, an isolated soy protein material is initially prepared by treatment of defatted soy bean flakes with an alkaline solution to solubilize the protein. The protein extract is then separated from the alkali insoluble solids by filtration or centrifugation. This protein extract or dispersion is typically used as the starting material in the process of the present invention. The extract or dispersion of the globular protein from the soy flakes will typically have a pH between 9.5 and 11.2. Using the protein extract from the isolate process is a preferred way of using an isolate in the preparation of the modified soy protein material of the present invention, since the extract itself has the protein already contained in an alkaline aqueous dispersion. However, it is equally apparent that a dried protein isolate which has been previously isolated from the soy flakes and dried may be used as the starting material wherein an alkaline dispersion of the dried protein material is formed for purposes of carrying out the chemical modification of the protein material pursuant to the present invention. Furthermore, the particular type of alkaline material that may be used to disperse the protein material or provide the alkaline extract of the soy bean flakes is not critical to the practice of the present invention. Any type of alkali or alkaline earth hydroxide or salts thereof may be readily and conveniently employed in preparation of the protein dispersion.

Typically, an alkaline dispersion of the vegetable protein material is formed to provide a dispersion having a proteinaceous solids level of at least about 2% by weight, typically 2 to 20% by weight, and preferably about 3 to 12% by weight. A most preferred level of proteinaceous solids in the dispersion is about 10% by weight. Furthermore, it is preferred that the dispersion have a pH of about 8 to 12, and preferably about 9 to 11. A most preferred pH for the alkaline dispersion for purposes of chemical modification of the protein is a pH of about 11.

Prior to reaction of the protein dispersion with the cationic monomer, the protein dispersion may be maintained in a substantially unhydrolyzed condition or may be hydrolyzed if desired. Either the unhydrolyzed or hydrolyzed vegetable protein material is suitable for reaction with the cationic monomer. Maintenance of the protein dispersion in a substantially unhydrolyzed condition refers to the absence of any significant reduction in individual sub-unit molecular weight of the protein material, whereas hydrolysis refers to a reduction in the individual sub-unit molecular weight of the protein material, either to a limited or to a complete extent. The degree of hydrolysis of the protein material is not critical to the practice of the present invention, and if hydrolysis of the protein is desired, typical conditions include a pH of about 10–12.5 at a temperature of 130°–145° F. for 30 minutes or less for a limited amount of hydrolysis of the protein or 90 minutes or more at the noted pH and temperature for substantially complete hydrolysis of the protein material.

The dispersion of protein material is then reacted with a cationic monomer in an amount sufficient to modify the protein material. The preferred reaction conditions for purposes of modifying the protein material include a temperature of about 20° to 60° C., and preferably 45° to 55° C., as well as a maintenance of a pH of about 10 to 11 during modification of the protein. The exact temperature and time of reaction or modification of the protein is not critical to the present invention, and because of the general relationship between time and temperature, relatively longer times of reaction would be required when low temperatures are employed, whereas relatively short reaction times would be required when somewhat higher temperatures are employed. The temperature for reaction or modification of the protein is limited only by the fact that if too high a temperature is employed it may adversely affect the coating characteristics of the protein material, and it is preferred that temperature of reaction not exceed 70° C., and most preferably be maintained below 60° C. A typical amount of cationic monomer is about 3% to 12% by weight of the protein solids, and preferably about 7% to 10% by weight of the protein solids.

The cationic monomer is preferably selected from the group consisting of cationic epoxide monomers and cationic acrylate monomers. Preferred cationic epoxide monomers are 3-chloro, 2-hydroxypropyltrimethyl ammonium chloride, 4-chlorobutene trimethyl ammonium chloride, and 2,3 epoxypropyltrimethyl ammonium chloride. Preferred cationic acrylate monomers are cationic acrylic acid and acrylamide derivatives such as methacrylamidopropyltrimethyl ammonium chloride, dimethylaminopropylmethacrylamide, isopropyl aminopropylmethacrylamide, and methacrylamidopropylhydroxyethyl-dimethylammonium acetate.

The epoxide or acrylic grouping on the above monomers react with the protein in an alkaline medium to substitute the cationic monomer in the protein molecule thereby providing a unique, chemically modified protein that provides adhesive coatings of very desirable properties.

Following modification of the protein material with the quaternary ammonium reagent, the modified protein material can be isolated by acid precipitation at the isoelectric point of the protein which is typically at a pH of about 4 to 5, and otherwise recovered by washing, filtering, pressing, or dewatering and drying of the product. Alternatively, the modified protein material can be spray-dried in the form of the alkaline dispersion without isoelectric precipitation if desired to provide a dried modified protein material also suitable for use in the preparation of pigment containing coating compositions.

Although the present invention has not intended to be limited by the exact types of coating compositions in which the modified protein adhesive binder of the present invention may be employed, nevertheless typical coating compositions which employ the modified protein adhesive binder of the present invention generally include ingredients such as pigments, fluidizers or thinning agents, as well as various other ingredients such as optical brighteners, lubricants and co-binders such as acrylic or styrene-butadiene latexes. Typically the modified vegetable protein adhesive binder of the present invention is dispersed in a solubilizing agent such as an alkaline material, typically sodium carbonate, ammonium hydroxide, sodium hydroxide and the like. These materials provide a conventional means of solubilizing various types of protein materials for use as adhesive binders in paper coating compositions. The exact amount of protein isolate used to prepare the binder solution is at a level sufficient to form an adhesive binder for the pigment coating and typically of a sufficient level so when the coating composition with the mineral pigment is prepared about 1 to 15% by weight of the coating comprises binder.

It may be desirable to further employ fluidizers or thinning agents in the preparation of the protein binder solution. This will improve the ultimate viscosity of coating compositions which are prepared with the protein binder solution. Typical fluidizers include materials such as dicyandiamide, ammonium nitrate, or urea. These agents may be employed in the preparation of the binder solution of the present invention and are added in amounts of between about 3 to 15%, preferably 5 to 10% by weight of the protein used to prepare the binder.

Following the formation of the protein binder solution, it is mixed with a mineral pigment in an amount sufficient to provide a slurry typically having a solids content of at least about 36% by weight, and typically between about 36 and 58% by weight of such slurry. The exact amount of pigment which may be employed in the present invention is not critical since a variety of levels may be suitable depending upon the exact coating characteristics desired. It is therefore typical to employ the pigment in an amount sufficient to provide a uniform coating on the substrate; the exact amount is not critical to the practice of the present invention. Furthermore, the exact type of pigment which may be employed is not critical and a variety of mineral pigments commonly used in the preparation of paper coatings, such as clay, calcium carbonate, titanium dioxide, and the like, are suitable.

Following dispersion of the mineral pigment with the proteinaceous adhesive binder solution, various other ingredients are added; such materials typically include co-binders such as the various latexes, preferably acrylic or styrene-butadiene latexes, which further improve the coating characteristics of the composition. The exact components of the coating composition with which the modified protein binder of the present invention may be employed is not critical to its practice since these represent a variety of materials all of which are well known to those skilled in the art.

The following examples represent specific but non-limiting embodiments of the present invention.

EXAMPLE 1

200 pounds of solvent extracted soybean flakes were extracted with 2,000 pounds of water at 90° F. to which was added 2.5% by weight of the flakes of calcium hydroxide. The soybean flakes were extracted for 30 minutes with the alkaline solution in order to solubilize the protein and the alkaline insoluble solids were then removed by centrifugation. The alkaline insoluble solids or extracted flakes were then re-extracted with an additional 1,200 pounds of water which had been preheated to a temperature of 90° F. in order to solubilize additional protein in the extracted flakes. Following extraction, the insoluble solids or extracted flakes were again removed from the extract by centrifugation. The two alkali protein extracts were combined to provide an alkaline extract or dispersion having a protein content of 3.0% by weight and a proteinaceous solids level of 5% by weight. The alkaline extract was maintained at 50° and the pH adjusted to 11 by the addition of a 50% solution of sodium hydroxide.

The alkaline extract having a proteinaceous solids level of 5% by weight was then reacted with 10% by weight of the protein solids of 3-chloro 2-hydroxypropyl trimethyl ammonium chloride available from Kay Fries, Inc., Rockleigh, N.J., under the trade name "Reagens-S-CFZ." Additional sodium hydroxide solution was added during the reaction to maintain the pH at about 11. A temperature of 50° for the reaction mixture was maintained as well. The reaction was allowed to proceed for 1 hour.

Following reaction or modification of the protein, the pH of the reaction mixture was adjusted to the isoelectric point or a pH of 4.7 by the addition of sulfuric acid. The substantially unhydrolyzed modified protein material was then separated from the reaction mixture, washed twice with water and dried.

EXAMPLE 2 portion of the alkaline extract of Example 1 having a protein content of 3.0% by weight was hydrolyzed by adding sodium hydroxide at a level of 8% by weight of the protein and heating to a temperature of 60°. Hydrolysis was carried out for 90 minutes at the noted temperature to result in substantially complete hydrolysis of the protein. The hydrolysis was arrested by adjusting the pH of the mixture to 4.5 by the addition of sulfuric acid. The reaction mixture was centrifuged to concentrate and separate the protein. The concentrated protein was then diluted to a 10% solids level by weight by the addition of water having a temperature of 50°-52° C. The pH of the slurry having a proteinaceous solids level of 10% by weight was adjusted to 11.0 by the addition of a 50% solution of sodium hydroxide. The slurry was then reacted with 10% by weight of the protein solids of 3-chloro 2-hydroxypropyl trimethyl ammonium chloride, available from Kay Fries, Inc. Rockleigh, N.J., under the trade name "Reagens-S-CFZ." Additional sodium hydroxide solution was added during the reaction to maintain the pH at about 11, and a temperature of 50° for the reaction mixture was maintained as well. The reaction was allowed/ to proceed for 1 hour.

Following reaction or modification of the protein, the pH of the reaction mixture was adjusted to the isoelectric point or a pH of 4.7 by the addition of sulfuric acid. The hydrolyzed, modified protein material was then separated from the reaction mixture, washed twice with water and dried.

EXAMPLE 3

A portion of the alkaline extract of Example 1 having a protein content of 3.0% by weight was partially hydrolyzed by adding sodium hydroxide at a level of 7% by weight of the protein and heating to a temperature of 60° C. Hydrolysis was carried out for 30 minutes at the noted temperature to result in partial hydrolysis of the protein. The hydrolysis was arrested by adjusting the pH of the mixture to 4.5 by the addition of sulfuric acid.

The reaction mixture was centrifuged to concentrate and separate the protein. The concentrated protein was then diluted to a 10% solids level by weight by the addition of water having a temperature of 50°-52° C. The pH of the slurry having a proteinaceous solids level of 10% by weight was adjusted to 11.0 by the addition of a 50% solution of sodium hydroxide. The slurry was then reacted with 10% by weight of the protein solids of 3-chloro 2-hydroxypropyl trimethyl ammonium chloride, available from Kay Fries, Inc., Rockleigh, N.J., under the trade name "Reagens-S-CFZ." Additional sodium hydroxide solution was added during the reaction to maintain the pH at about 11. A temperature of 50° C. for the reaction mixture was maintained as well. The reaction was allowed to proceed for 1 hour.

Following reaction or modification of the protein, the pH of the reaction mixture was adjusted to the isoelectric point or a pH of 4.7 by the addition of sulfuric acid. The partially hydrolyzed protein material was then separated from the reaction mixture, washed twice with water and dried.

EXAMPLE 4

The modified substantially unhydrolyzed protein binder produced in Example 1 was evaluated as an adhesive binder in a pigment containing coating composition.

An alkaline dispersion of the modified protein of Example 1 was prepared by dispersing the protein at a solids level of 10% by weight in a 0.35 molar sodium hydroxide solution.

Two separate paper coating compositions were prepared each having a total solids level of 58% by weight in which the coating contained 90 parts by weight of clay, 10 parts by weight of titanium dioxide. One coating employed 4 parts by weight of a styrene-butadiene latex and 1 part by weight of the modified protein as a binder. The rheological properties of both coatings were evaluated as listed in Table 1. The two coating compositions containing the different binders were then applied to paper with a draw down bar. The coated paper was evaluated for gloss, IGT value, and ink receptivity. The IGT value measures the force the coating will withstand with certain types of ink used in printing. The ink receptivity is measured by the percentage drop for K&N ink. The smaller the number of ink receptivity, the more non-porous the coating is and therefore a lesser degree of ink penetration into the coating. These various methods for evaluating the coating are standard methods of measurement published by the *Technical Association of Pulo and Paper Industries* (TAPPI). The results of the testing are set forth in table 2.

TABLE 1

Coating Viscosity (CPS) Of Two Coating Compositions Containing The Modified Protein Isolate Of Example 1 At 25° C.

|  | 4 Parts Latex 2 Parts Modified Protein | 5 Parts Latex 1 Part Modified Protein |
|---|---|---|
| RVT Speed (RPM) | | |
| 10 | 6000 | 3740 |
| 20 | 3500 | 2200 |
| 50 | 1760 | 1100 |
| 100 | 1070 | 680 |
| S. D. Warren Water Retention | | |
| SEC | 4.1 | 3.2 |

TABLE 2

Coating Evaluation Of Two Coating Compositions Using The Modified Protein Isolate Of Example 1

|  | 4 Parts Latex 2 Parts Modified Protein (Calendered 3 nips) | 5 Parts Latex 1 Part Modified Protein (Calendered 3 nips) |
|---|---|---|
| Coatweight | 11.8 | 11.1 |

TABLE 2-continued

Coating Evaluation Of Two Coating Compositions Using The Modified Protein Isolate Of Example 1

|  | 4 Parts Latex 2 Parts Modified Protein (Calendered 3 nips) | 5 Parts Latex 1 Part Modified Protein (Calendered 3 nips) |
|---|---|---|
| (gm/m$^2$) | | |
| Opacity (%) | 90.4 | 90.4 |
| 75° Gloss (%) | 80.0 | 81.0 |
| Brightness | 81.3 | 81.2 |
| K & N Ink Receptivity (% drop) | 25.1 | 22.1 |
| IGT | | |
| Ink | 3 | 3 |
| Velocity (cm/sec) | 127 | 129 |
| Coating Lift Off Speed/Pressure | A/25 | A/25 |
| Wet Rub Resistance (% T) | 58.1 | 42.2 |

Both coatings had comparable rheological properties and coating characteristics. Both coatings were relatively weak as evidenced by the low IGT values. The 5/1 coating was less ink receptive and the 4/2 coating was wetrub resistant.

EXAMPLE 5

The modified hydrolyzed protein binder produced in Example 2 was evaluated as an adhesive binder in a pigment containing coating composition. An alkaline dispersion of the modified protein isolate of Example 2 was prepared by dispersing the protein at a solids level of 13.5% by weight in a 0.30 molar ammonium hydroxide solution.

Two separate paper coating compositions were prepared, each having a total solids level of 58% by weight in which the coating contained 90 parts by weight of clay, 10 parts by weight of titanium dioxide. One coating employed 4 parts by weight of a styrene-butadiene latex and 2 parts by weight of the modified protein as the binder. The second coating employed 5 parts by weight of a styrene-butadiene latex and 1 part by weight of the modified protein as a binder. The rheological properties of both coatings were evaluated as listed in Table 3. The coatings were then applied to paper with a draw bar and evaluated as described in Example 4. The results of the coating evaluation is listed in Table 4.

TABLE 3

Coating Viscosity (CPS) Of Two Coating Compositions Containing The Modified Protein Isolate Of Example 2 At 25° C.

|  | 4 Parts Latex 2 Parts Modified Protein | 5 Parts Latex 1 Part Modified Protein |
|---|---|---|
| RVT Speed (RPM) | | |
| 10 | 2850 | 2650 |
| 20 | 1725 | 1525 |
| 50 | 890 | 730 |
| 100 | 555 | 450 |
| S. D. Warren Water Retention | | |
| SEC | 4.5 | 2.8 |

TABLE 4

Coating Evaluation Of Two Coating Compositions Using The Modified Protein Isolate Of Example 2

|  | 4 Parts Latex 2 Parts Modified Protein (Calendered 3 nips) | 5 Parts Latex 1 Part Modified Protein (Calendered 3 nips) |
|---|---|---|
| Coatweight (gm/m$^2$) | 10.6 | 10.0 |
| Opacity (%) | 89.1 | 89.1 |
| 75° Gloss (%) | 74.5 | 78.4 |
| Brightness | 81.0 | 81.2 |
| K & N Ink Receptivity (% drop) | 22.4 | 21.3 |
| IGT |  |  |
| Ink | 3 | 3 |
| Velocity (cm/sec) | 134 | 156 |
| Coating Lift Off Speed Pressure | A/25 | A/25 |
| Wet Rub Resistance (% T) | 70.7 | 54.8 |

Both coatings had good rheological properties. Both coatings had relatively good strength as shown by the IGT values and had an exceptional degree of wet rub resistance.

EXAMPLE 6

The modified, partially hydrolyzed protein binder proclaimed in Example 3 was evaluated as an adhesive binder in a pigment containing coating composition. An alkaline dispersion of the modified protein isolate of Example 3 was prepared by dispersing the protein at a solids level of 13.5% by weight in a 0.30 molar ammonium hydroxide solution.

Two separate paper coating compositions were prepared, each having a total solids level of 58% by weight in which the coating contained 90 parts by weight of clay and 10 parts by weight of titanium dioxide. One coating employed 4 parts by weight of a styrene-butadiene latex and 2 parts by weight of the modified protein as the binder. The second coating employed 5 parts by weight of a styrene-butadiene latex and 1 part by weight of the modified protein as a binder. The rheological properties of both coatings were evaluated as listed in Table 5. The coatings were then applied to paper with a draw bar and evaluated as described in Example 4. The results of the coating evaluation is listed in Table 6.

TABLE 5

Coating Viscosity (CPS) Of Two Coating Compositions Containing The Modified Partially Hydrolyzed Protein Isolate Of Example 3 At 25° C.

|  | 4 Parts Latex 2 Parts Modified Protein | 5 Parts Latex 1 Part Modified Protein |
|---|---|---|
| RVT Speed (RPM) |  |  |
| 10 | 4050 | 4200 |
| 20 | 2350 | 2450 |
| 50 | 1160 | 1210 |
| 100 | 720 | 740 |
| S. D. Warren Water Retention |  |  |
| SEC | 3.5 | 2.4 |

TABLE 6

Coating Evaluation Of Two Coating Compositions Using The Modified Partially Hydrolyzed Isolate Of Example 3

|  | 4 Parts Latex 2 Parts Modified Protein | 5 Parts Latex 1 Part Modified Protein |
|---|---|---|
| Coatweight (gm/m$^2$) | 11.8 | 10.4 |
| Opacity (%) | 89.6 | 89.0 |
| Brightness | 81.5 | 81.2 |
| 75° Gloss (%) | 73.6 | 73.5 |
| K & N Ink Receptivity (% drop) | 25.8 | 22.5 |
| IGT |  |  |
| Ink | 3 | 3 |
| Velocity (cm/sec) | 128 | 115 |
| Coating Lift Off Speed/Pressure | A/25 | A/25 |
| Wet Rub Resistance (% T) | 70.8 | 52.8 |

Based on the evaluation, both coatings had a relatively low binder strength, however; the wet rub resistance of both coatings was excellent.

EXAMPLE 7

A dried modified protein isolate was produced as described in Example 2, except that the protein slurry was reacted with 10% by weight of the protein solids of methacrylamidopropyltrimethyl ammonium chloride at 48° C.±2° C.

The modified hydrolyzed binder produced above was evaluated as an adhesive binder in a pigment containing coating composition.

An alkaline dispersion of the modified protein isolate of Example 2 was prepared by dispersing the protein at a solids level of 13.5% by weight in a 0.30 molar ammonium hydroxide solution.

Two separate paper coating compositions were prepared, each having a total solids level of 58% by weight in which the coating contained 90 parts by weight of clay, 10 parts by weight of titanium dioxide. One coating employed 4 parts by weight of a styrene-butadiene latex and 2 parts by weight of the modified protein as the binder. The second coating employed 5 parts by weight of a styrene-butadiene latex and 1 part by weight of the modified protein as a binder. The rheological properties of both coatings were evaluated as listed in Table 7. The coatings were then applied to paper with a draw bar and evaluated as described in Example 4. The results of the coating evaluation is listed in Table 8.

TABLE 7

Coating Viscosity (CPS) Of Two Coating Compositions Containing The Modified Protein Isolate Of Example 7 At 25° C.

|  | 4 Parts Latex 2 Parts Modified Protein | 5 Parts Latex 1 Part Modified Protein |
|---|---|---|
| RVT Speed (RPM) |  |  |
| 10 | 2250 | 2850 |
| 20 | 1425 | 1525 |
| 50 | 800 | 760 |
| 100 | 500 | 460 |
| S. D. Warren Water Retention |  |  |
| SEC | 5.9 | 3.9 |

TABLE 8

Coating Evaluation Of Two Coating Compositions
Using The Modified Protein Isolate Of Example 7

| | 4 Parts Latex<br>2 Parts Modified<br>Protein<br>(Calendered 3 nips) | 5 Parts Latex<br>1 Part Modified<br>Protein<br>(Calendered 3 nips) |
|---|---|---|
| Coatweight (gm/m$^2$) | 8.6 | 9.7 |
| Opacity (%) | 93.6 | 93.2 |
| 75° Gloss (%) | 74.5 | 75.9 |
| Brightness | 80.5 | 80.5 |
| K & N Ink Receptivity (% drop) | 24.5 | 24.6 |
| IGT | | |
| Ink | 4 | 4 |
| Velocity (cm/sec) | 135 | 148 |
| Coating Lift Off | | |
| Speed Pressure | M/50 | M/50 |
| Wet Rub Resistance (% T) | 54.0 | 56.8 |

The coatings had excellent adhesive strength and a somewhat higher degree of opacity then the coatings in the other Examples.

While the present invention has been described insofar as the specific embodiments set back alone, it is intended to include within the scope of the present invention, all equivalents, or reasonable modifications thereof.

What is claimed is:

1. A process for the production of a modified vegetable portein adhesive binder comprising:
   (a) forming an alkaline dispersion of a vegetable protein material;
   (b) treating said dispersion with a cationic monomer selected from the group consisting of cationic epoxide monomers and cationic acrylate monomers, in an amount sufficient to modify the protein material.

2. The process of claim 1 wherein said vegetable protein material is a vegetable protein isolate.

3. The process of claim 1 wherein said dispersion has a proteinaceous solids level of at least about 2% by weight.

4. The process of claim 3 wherein said dispersion has a proteinaceous solids level of about 2 to 20% by weight.

5. the process of claim 4 wherein said dispersion has a proteinaceous solids level of about 3 to 12% by weight.

6. The process of claim 1 wherein said dispersion has a pH of about 8 to 12.

7. The process of claim 6 wherein said dispersion has a pH of about 9 to 11.

8. The process of claim 1 wherein said dispersion has a temperature of about 20° to 60° C.

9. The process of claim 1 wherein the amount of cationic monomer is about 3 to 12% by weight of the protein solids.

10. The process of claim 9 wherein the amount of monomer is about 7 to 10% by weight of the protein solids.

11. The process of claim 1 wherein the cationic epoxide monomer is selected from the group consisting of 3-chloro 2-hydroxypropyltrimethyl ammonium chloride, 4-chlorobutene trimethyl ammonium chloride, and 2,3 epoxypropyltrimethyl ammonium chloride.

12. The process of claim 1 wherein the cationic acrylate monomer is selected from the group consisting of cationic acrylic acid and cationic acrylamide derivatives.

13. The process of claim 1 wherein the cationic acrylate monomer is selected from the group consisting of methacrylamidopropyltrimethyl ammonium chloride, dimethylaminopropylmethacrylamide, isopropylaminopropylmethacrylamide, and methacrylamidopropylhydroxyethyldimethyl ammonium acetate.

14. The process of claim 1 wherein the vegetable protein material is a soy protein isolate.

15. The process of claim 1 including the step of adjusting the pH of the treated dispersion to the isoelectric point to precipitate the modified protein mateial.

16. The process of claim 1 including the step of dewatering the modified protein material.

17. The product produced by the process of claim 1.

* * * * *